US010496654B2

(12) United States Patent
Feng et al.

(10) Patent No.: US 10,496,654 B2
(45) Date of Patent: *Dec. 3, 2019

(54) SYSTEMS AND METHODS FOR SOCIAL MEDIA DATA MINING

(71) Applicant: AT&T Intellectual Property I, L.P., Atlanta, GA (US)

(72) Inventors: Junlan Feng, Basking Ridge, NJ (US); Luciano de Andrade Barbosa, Madison, NJ (US); Valerie Torres, Bronx, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/985,788

(22) Filed: Dec. 31, 2015

(65) Prior Publication Data

US 2016/0110429 A1    Apr. 21, 2016

Related U.S. Application Data

(63) Continuation of application No. 12/858,852, filed on Aug. 18, 2010, now Pat. No. 9,262,517.

(51) Int. Cl.
*G06F 15/16* (2006.01)
*G06F 16/2458* (2019.01)
*G06F 16/35* (2019.01)
*G06F 16/951* (2019.01)
(Continued)

(52) U.S. Cl.
CPC ........ *G06F 16/2465* (2019.01); *G06F 16/355* (2019.01); *G06F 16/951* (2019.01); *G06Q 30/02* (2013.01); *G06Q 50/01* (2013.01)

(58) Field of Classification Search
None
See application file for complete search history.

(56) References Cited

U.S. PATENT DOCUMENTS 7,185,065 B1 * 2/2007 Holtzman ........... G06F 17/2745
705/36 R
7,421,660 B2 * 9/2008 Charnock ......... G06F 17/30389
707/999.003

(Continued)

OTHER PUBLICATIONS

U.S. Office Action dated Nov. 2, 2012 in U.S. Appl. No. 12/858,852.
(Continued)

*Primary Examiner* — John B Walsh
(74) *Attorney, Agent, or Firm* — Hartman & Citrin LLC (57) ABSTRACT

Systems and methods are provided to collect, analyze and report social media aggregated from a plurality of social media websites. Social media is retrieved from social media websites, analyzed for sentiment, and categorized by topic and user demographics. The data is then archived in a data warehouse and various interfaces are provided to query and generate reports on the archived data. In some embodiments, the system further recognizes alert conditions and sends alerts to interested users. In some embodiments, the system further recognizes situations where users can be influenced to view a company or its products in a more favorable light, and automatically posts responsive social media to one or more social media websites.

17 Claims, 8 Drawing Sheets

(51) Int. Cl.
*G06Q 30/02* (2012.01)
*G06Q 50/00* (2012.01)

(56) References Cited

U.S. PATENT DOCUMENTS

| | | | | |
|---|---|---|---|---|
| 7,600,017 B2* | 10/2009 | Holtzman | G06F 17/2745 | 709/224 |
| 7,818,394 B1* | 10/2010 | Lawler | G06Q 10/10 | 709/200 |
| 7,831,684 B1* | 11/2010 | Lawler | G06Q 10/10 | 709/200 |
| 7,844,671 B1* | 11/2010 | Lawler | G06F 15/16 | 709/204 |
| 7,958,109 B2* | 6/2011 | Lin | G06F 17/30719 | 707/706 |
| 7,974,983 B2* | 7/2011 | Goeldi | G06Q 10/00 | 707/628 |
| 8,010,545 B2* | 8/2011 | Stefik | G06F 17/3071 | 707/758 |
| 8,010,619 B1* | 8/2011 | Lawler | G06F 15/16 | 709/200 |
| 8,073,850 B1* | 12/2011 | Hubbard | G06Q 30/02 | 705/14.52 |
| 8,271,429 B2 | 9/2012 | Ghuneim et al. | | |
| 2002/0062368 A1* | 5/2002 | Holtzman | G06F 21/31 | 709/224 |
| 2008/0071796 A1 | 3/2008 | Ghuneim et al. | | |
| 2008/0091656 A1* | 4/2008 | Charnock | G06F 17/30713 | |
| 2008/0215607 A1* | 9/2008 | Kaushansky | G06Q 30/02 | |
| 2009/0164417 A1* | 6/2009 | Nigam | G06Q 30/02 | |
| 2009/0319518 A1* | 12/2009 | Koudas | G06F 17/30696 | |
| 2010/0057577 A1* | 3/2010 | Stefik | G06Q 30/02 | 705/14.73 |
| 2010/0119053 A1 | 5/2010 | Goeldi | | |
| 2010/0121707 A1* | 5/2010 | Goeldi | G06Q 10/00 | 705/14.49 |
| 2010/0121843 A1 | 5/2010 | Goeldi | | |
| 2010/0121849 A1* | 5/2010 | Goeldi | G06Q 10/00 | 707/736 |
| 2010/0141655 A1* | 6/2010 | Belinsky | G11B 27/28 | 345/440 |
| 2010/0257117 A1* | 10/2010 | Shvadron | G06F 17/30616 | 705/36 R |
| 2010/0275128 A1* | 10/2010 | Ward | G06Q 10/06 | 715/744 |
| 2010/0299326 A1* | 11/2010 | Germaise | G06F 17/30867 | 707/728 |
| 2010/0306249 A1* | 12/2010 | Hill | G06F 17/30867 | 707/769 |
| 2010/0325127 A1* | 12/2010 | Chaudhuri | G06F 17/30528 | 707/759 |
| 2011/0004483 A1* | 1/2011 | Ting | G06Q 30/02 | 705/1.1 |
| 2011/0055007 A1* | 3/2011 | Kitagawa | G06F 9/4443 | 705/14.49 |
| 2011/0055196 A1* | 3/2011 | Sundelin | G06F 17/30539 | 707/711 |
| 2011/0179020 A1* | 7/2011 | Ozzie | G06F 17/3089 | 707/723 |
| 2011/0196677 A1* | 8/2011 | Deshmukh | G10L 15/22 | 704/246 |
| 2012/0005224 A1* | 1/2012 | Ahrens | G06Q 10/10 | 707/769 |
| 2012/0047534 A1* | 2/2012 | Gharachorloo | H04N 5/76 | 725/53 |

OTHER PUBLICATIONS

U.S. Office Action dated Apr. 16, 2013 in U.S. Appl. No. 12/858,852.
U.S. Office Action dated Apr. 8, 2014 in U.S. Appl. No. 12/858,852.
U.S. Office Action dated Oct. 7, 2014 in U.S. Appl. No. 12/858,852.
U.S. Office Action dated Feb. 4, 2015 in U.S. Appl. No. 12/858,852.
U.S. Office Action dated Jul. 14, 2015 in U.S. Appl. No. 12/858,852.
U.S. Notice of Allowance dated Sep. 25, 2015 in U.S. Appl. No. 12/858,852.

* cited by examiner

XYZ
ABC drop lawsuits against each other concerning wireless services but don agree pull ads began issue 1st place Wish would stop lying their commercials ve had year half no 3G CZ LOL Good point 2 part postcard throwing ad annoying Its like watching bad standup comedy routine self

FIG. 4

STREAM: 145 tweets for the current hour

| | |
|---|---|
| 2009120317:38:17 -- Thu | So Dan was all ready to give me an iPhone for Xmas (HOORAY!) but then discovered that it would cost $400 (BOO!) Way to be a Grinch XYZ |
| 2009120315:38:02 -- Thu | To all my friends that still work at XYZ wireless, congratulations for the WORST customer service ever!! LOL!!! |
| 2009120315:37:31 -- Thu | @XYZ I never the, but I have VZW - I was just bad-mouthing @XYZ 1st and 2nd hand. :) P.S. - lovin my Droid on VZW |
| 2009120315:37:19 -- Thu | There's An Apology For That. XYZ Dismisses Its Pointless Lawsuit Against ABC Over Ads | Techdirt - http://shar.es/alX2V |
| 2009120315:37:18 -- Thu | Dear XYZ I work from home... so stop killing my internet all the time. Thanks. |

SYSTEMS AND METHODS FOR SOCIAL MEDIA DATA MINING

CROSS-REFERENCE TO RELATED APPLICATIONS

This application is a continuation of and claims priority to U.S. patent application Ser. No. 12/858,852, entitled "Systems and Methods for Social Media Data Mining," filed Aug. 18, 2010, now U.S. Pat. No. 9,262,517, which is incorporated herein by reference in its entirety.

TECHNICAL FIELD

At least some embodiments disclosed herein relate, in general, to systems that collect information available over the Internet, and more particularly, to collecting data from social networking sites and providing tools to query and analyze such information.

BACKGROUND

Websites that allow users to interact with one another have exploded in popularity in the last few years. Social networking web sites such as Facebook and LinkedIn, and microblogging websites such as Twitter enjoy widespread use. Millions of users post messages, images and videos on such websites on a daily, even hourly basis, oftentimes reporting events on a real-time or near-time basis, and revealing the user's activities and interests. Users typically direct messages to specific persons, their social group, or perhaps businesses maintaining a presence on social networking websites; however, oftentimes such messages are visible to the general public.

Such publicly accessible social media represents a potentially rich mine of information that can provide insight into user's lives and events across the country and across the world. Such information could be of great interest to various types of business organizations. For example, a network provider may wish to track all messages describing network problems across the country on a real-time basis. In another example, a national hotel chain may wish to track all messages relating to its hotel services, and in particular, messages reporting problems experienced by hotel guests. The sheer volume of such information, however, and the velocity of its flow, presents formidable difficulties for persons or organizations that wish to track and analyze such information.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference in this specification to "social media" should be understood to refer to any type of electronically-stored information that users send or make available to other users for the purpose of interacting with other users in a social context. Such media can include directed messages, status messages, broadcast messages, audio files, image files and video files. Reference in this specification to "social media websites" should be understood to refer to any website that facilitates the exchange of social media between users. Examples of such websites include social networking websites such as Facebook and LinkedIn and microblogging websites such as Twitter.

Figure 1:
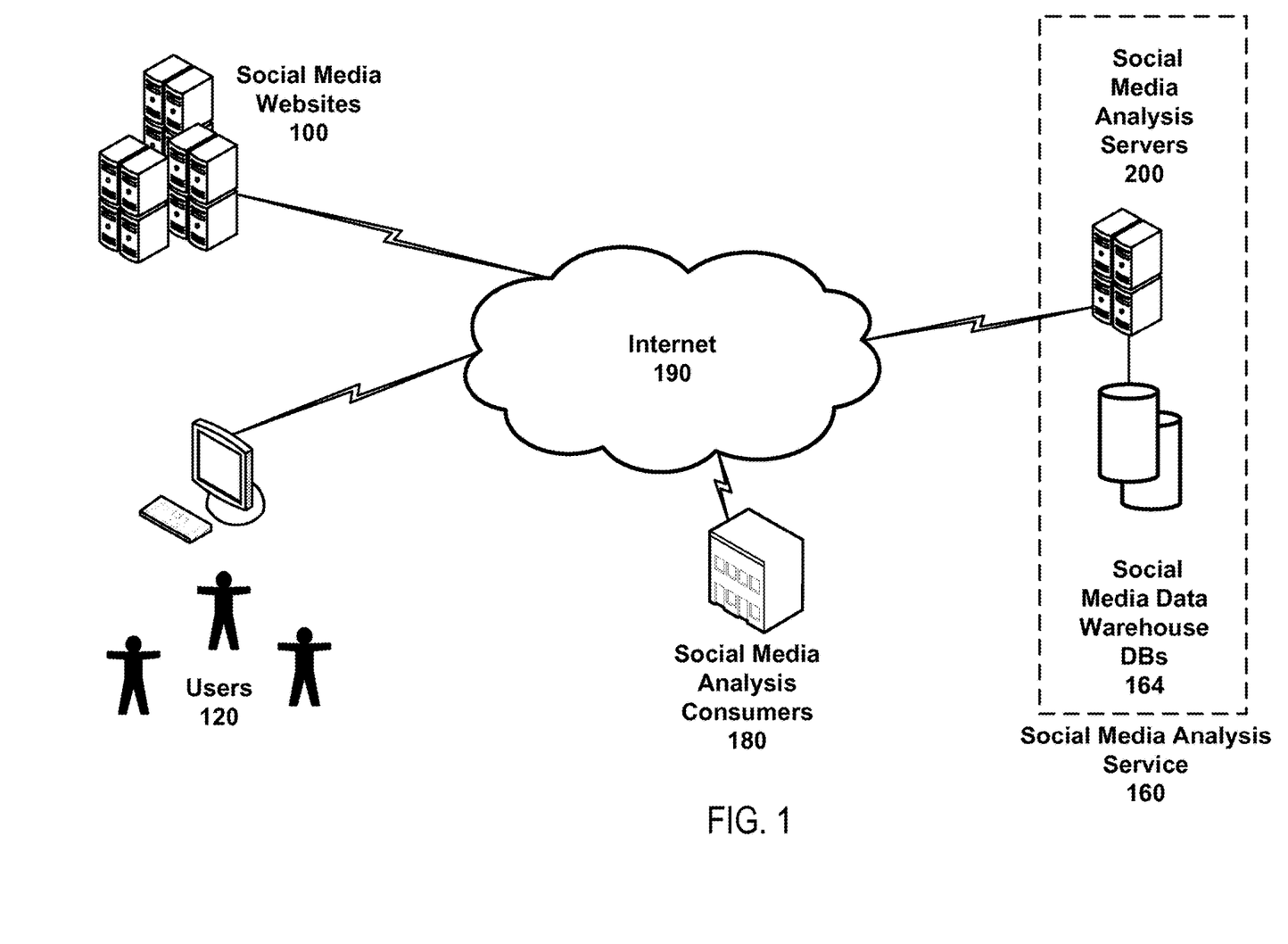
FIG. 1 illustrates a high-level view of a social media analysis service in the context of a network of users and social media sources.

Various embodiments of the systems and methods disclosed herein collect and enrich social media gathered from a plurality of social media websites and provide various interfaces and reporting functions to allow end users to track topics within such enriched social media. FIG. 1 illustrates a high-level view of a social media analysis service in the context of a network of users and social media sources. A plurality of users 120 interact with one another via a plurality of social media websites 100 such as, for example, social networking and microblogging web sites.

A social media analysis service 160 hosts one or more social media analysis servers 200 that collect social media from social media websites 100 and enrich and store such social media in one or more social media data warehouse databases 164. The social media analysis servers 200 provide one or more user interfaces that allow social media analysis consumers 180 to view and analyze aggregated social media stored on the social media data warehouse databases 164. Such consumers could include any type of business that has an interest in the content of social media. In one embodiment, the social media analysis service 160 and the social media analysis consumers 180 could be within a single organization. In one embodiment, the social media analysis service 160 and the social media analysis consumers 180 could be separate entities. The social media websites 100, the users 120, the social media analysis consumers 180, and the social media analysis service 160 can communicate with one another via the Internet 190.

Figure 2:
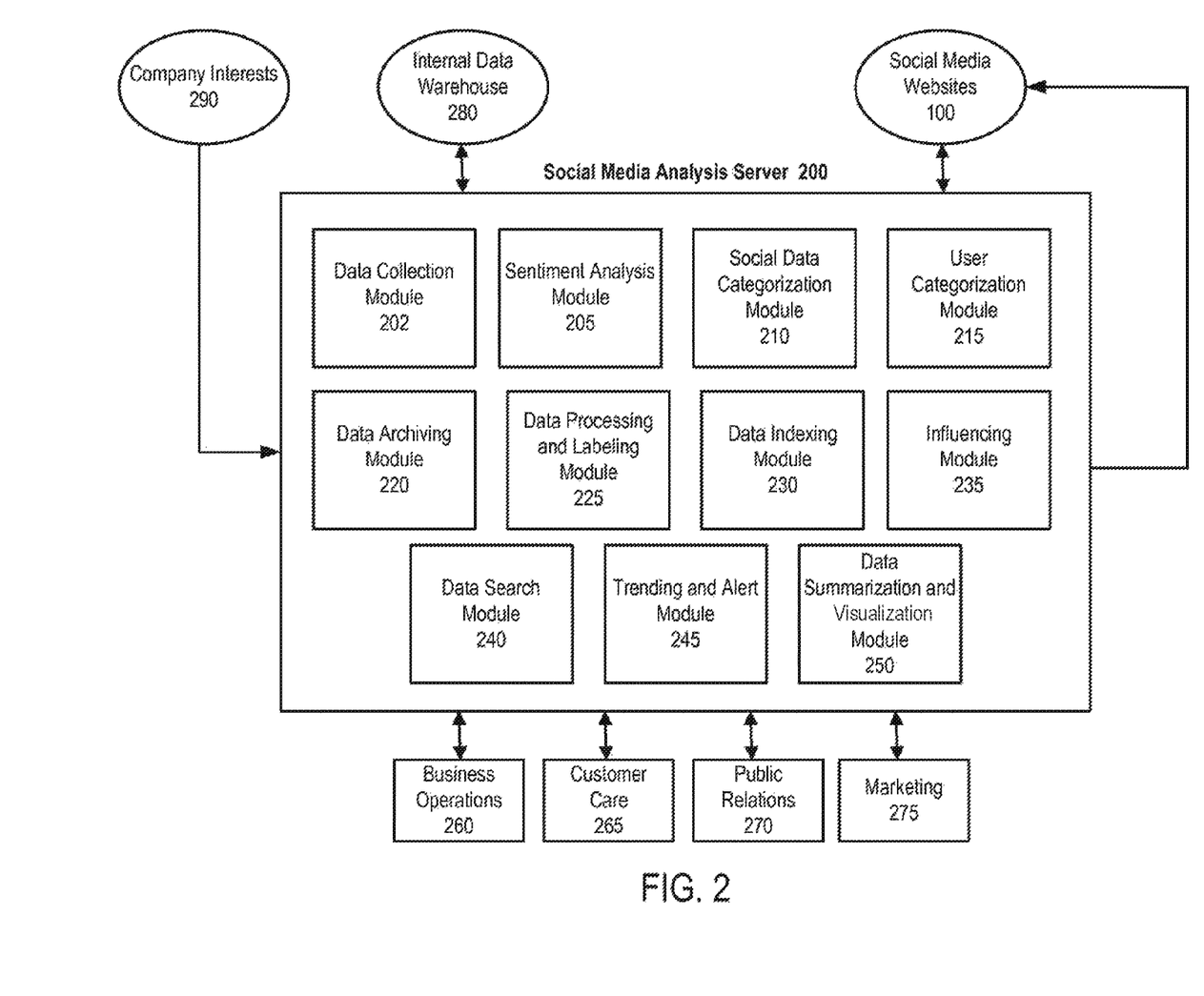
FIG. 2 illustrates a more detailed view of a social media analysis server.

FIG. 2 illustrates a more detailed view of a social media analysis server 200. In the illustrated embodiment, social media analysis server 200 collects social media from various social media websites 100, stores the collected media in an internal data warehouse 280 and provides access to the warehoused social media to various business units within a business. Such business units could include business operations 260, customer care 265, public relations 270 and marketing 275.

The social media analysis server 200 comprises a number of modules that provide various functions related to social media collection analysis. In one embodiment, the social media analysis server 200 includes a data collection module 202 that collects social media from social media websites 100. In one embodiment, the data collection module 202 collects social media that relates to company interests 290, such as, for example, posts that reference the company by name, posts that relate to specific topics, and/or posts that relate to specific users.

In one embodiment, the social media analysis server 200 includes a sentiment analysis module 205 that attempts to determine the nature of the sentiments, such as tone and mood, expressed by users in social media posts. In one embodiment, the social media analysis server 200 includes a social data categorization module 210 that categorizes social media postings by, for example, topic, company, mood or tone. In one embodiment, the social media analysis server 200 includes user categorization module 215 that categorizes users, for example, by various demographic characteristics or usage patterns. In one embodiment, the social media analysis server 200 includes a data archiving module 220 that archives collected social media in the internal data warehouse 280 in association with user profiles and user social connections of users relating to the social media. In one embodiment, the social media analysis server 200 includes a data processing and labeling module 225 that labels social media data with various tags, such as categories determined by the social data categorization module 210 and the user categorization module 215. In one embodiment, the social media analysis server 200 includes a data indexing module 230 that indexes archived social media by one or more properties. Such properties could include, for example, key words, user sentiments, or user demographics. In one embodiment, the social media analysis server 200 includes an influencing module 235 that posts data to social media web sites in response to the occurrence of influencing conditions in archived social media to influence users of such social media websites.

In one embodiment, the social media analysis server 200 includes a data search module 240 that provides facilities allowing users to search archived social media using search criteria such as, for example, one or more keywords or key phrases. In one embodiment, the server includes a trending and alert module 245 that identifies conditions in social media that users have selected for alerts, for example, degradation in network performance.

In one embodiment, the social media analysis server 200 includes a data summarization and visualization module 250 that allows social data analysis consumers to query social media archived in the internal data warehouse 280. In one embodiment, the data summarization and visualization module 250 uses the aggregated social media, along with associated archived user profile information and user social connections to support high-level business intelligence through data mining. In one embodiment, data visualization and summarization functions provide facilities to visualize the trend of the archived posts and categorized topics, social media trends with internal business data and correlated posts from similar topics for intelligence mining. In one embodiment, the output of data mining and analysis is stored on a database and indexed by the data archiving module 220 along with archived posts, user profiles, and user social connection to support expanded search capabilities. In one embodiment, the data summarization and visualization module 250 provides various views into the aggregated social media, as shown in FIGS. 3-6 below. Such visualized information can be used to guide business operations 260, customer care 265, public relations 270 and marketing 275, to engage in social media conversation for better communications with customers and consumers.

Figure 3:
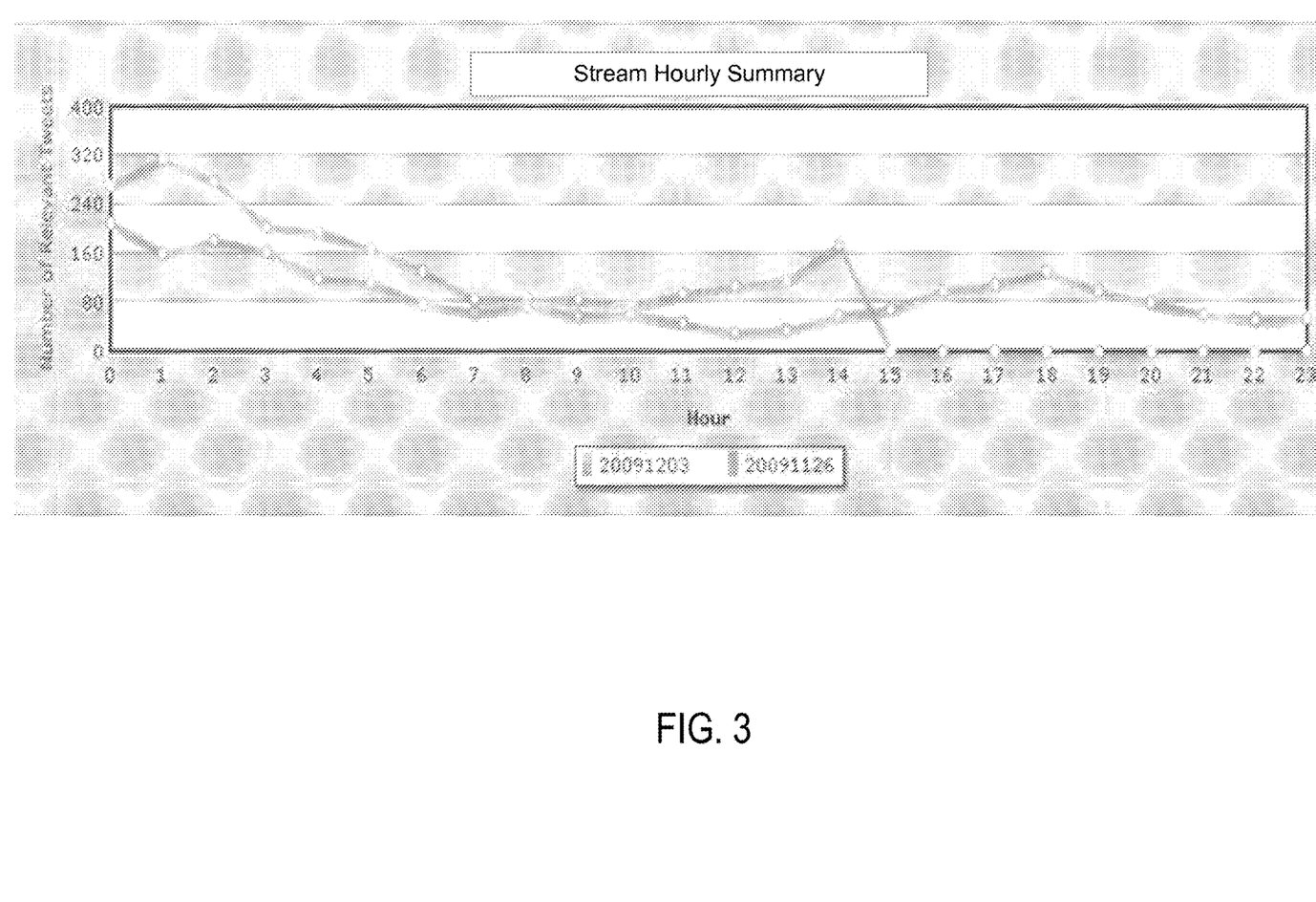
FIG. 3 illustrates an interface that displays a simple count of social media posts (e.g. tweets on Twitter) relating to a topic "XYZ."
Figure 4:
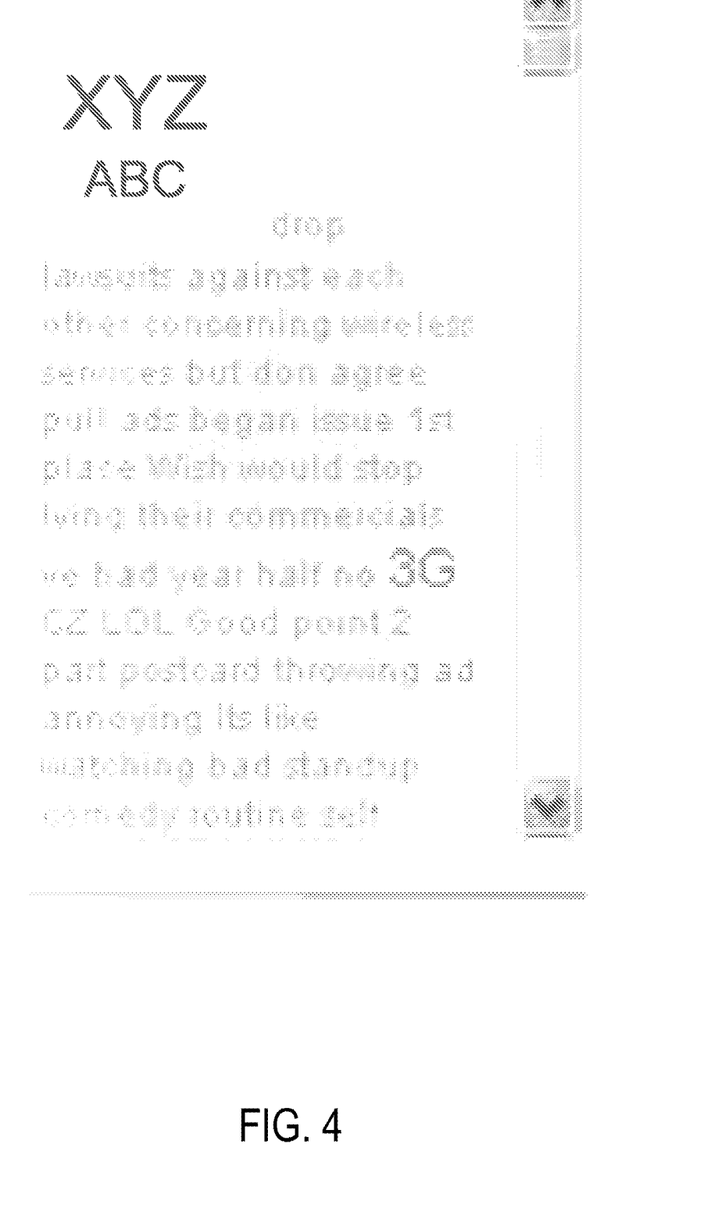
FIG. 4 illustrates an interface that displays a cloud of the most common phrases associated with the topic "XYZ" in the past hour.
Figure 5:
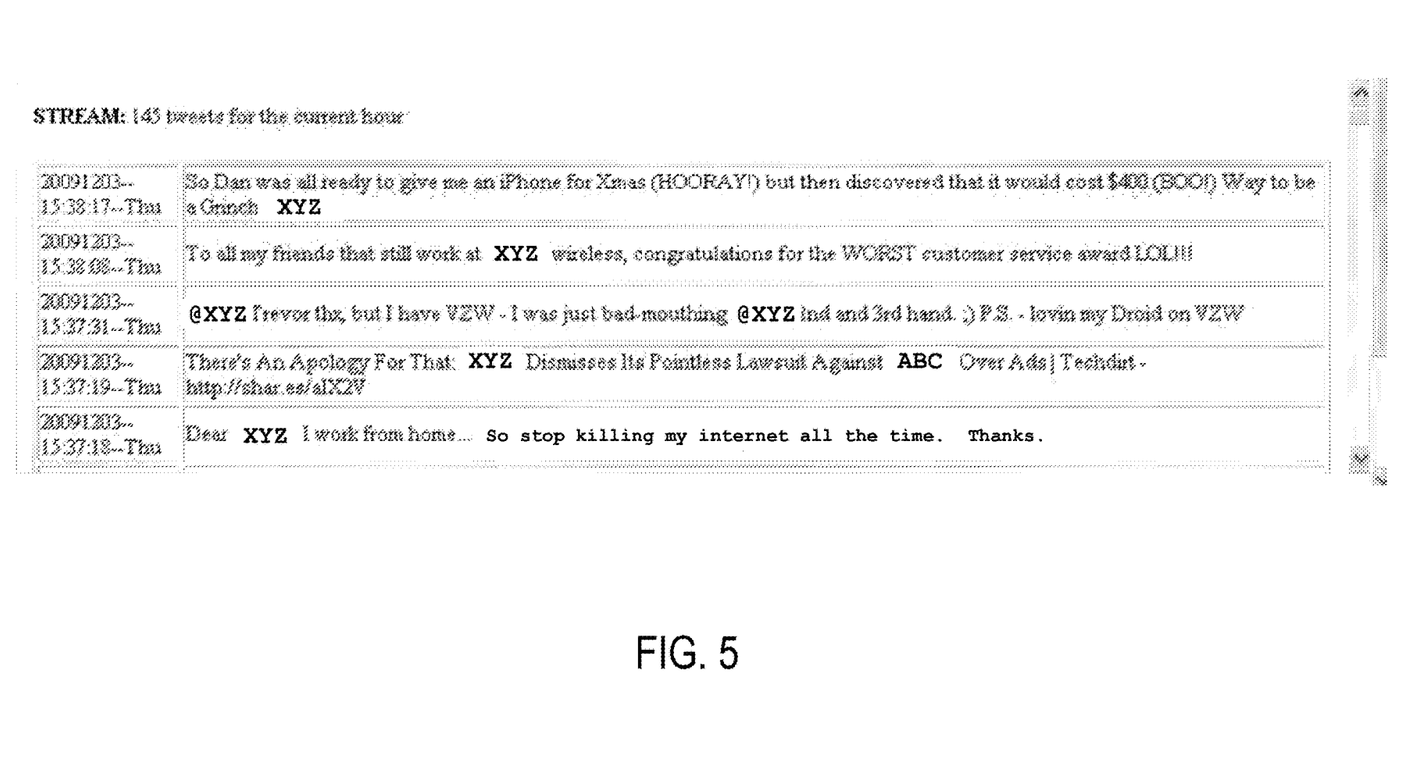
FIG. 5 illustrates an interface that displays a real-time stream of the most recent social media posts relating to the topic "XYZ."
Figure 6:
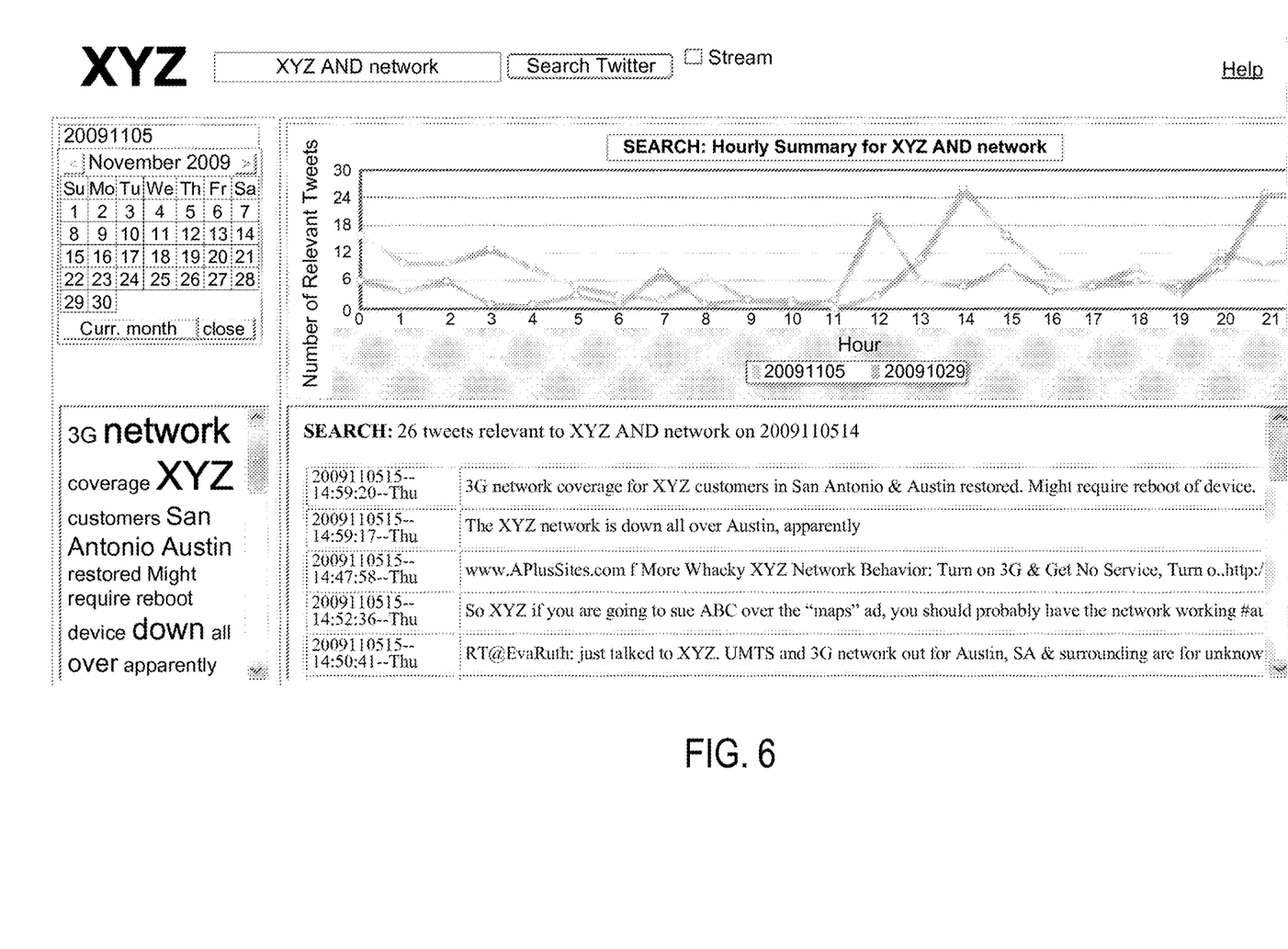
FIG. 6 illustrates an interface that consolidates interfaces shown in FIGS. 3-5 relating to a topic "XYZ."

FIG. 3 illustrates an interface that displays a simple count of social media posts (e.g. tweets on Twitter) relating to a topic "XYZ." The line relating to 20091203 reflects data for the current date, the data reflecting zero counts for times after the current time (15:00). The line relating to 20091126 displays counts for the previous week. FIG. 4 illustrates an interface that displays a cloud of the most common phrases associated with the topic "XYZ" in the past hour. Such a cloud could enable a user to view the most common topics associated with "XYZ." In one embodiment, a user clicks on a phrase to launch an interface, such as that shown in FIG. 3, where the system queries on the phrase "XYZ" and the selected phrase. FIG. 5 illustrates an interface that displays a real-time stream of the most recent social media posts relating to the topic "XYZ." In one embodiment, a user clicks on a phrase to launch an interface, such as that shown in FIG. 3, where the system queries on the phrase "XYZ" and key words extracted from the selected phrase. FIG. 6 illustrates an interface that consolidates interfaces shown in FIGS. 3-5 relating to a topic "XYZ." In one embodiment, a user clicks on a phrase to launch an interface, such as that shown in FIG. 3, where the system queries on the phrase "XYZ" and the selected phrase.

Other interfaces are possible. For example, the interface could display user sentiment relating to a topic in a format similar to an election map. The map could, for example, reflect a map of the United States reflecting sentiment by state. States reflecting predominantly negative sentiments could be colored red, states reflecting predominantly positive sentiments could be colored green and states reflecting predominantly neutral sentiments could be colored white. Alternatively, the interface could express various sentiments as patterns, such as shading and cross-hatching.

Figure 7:
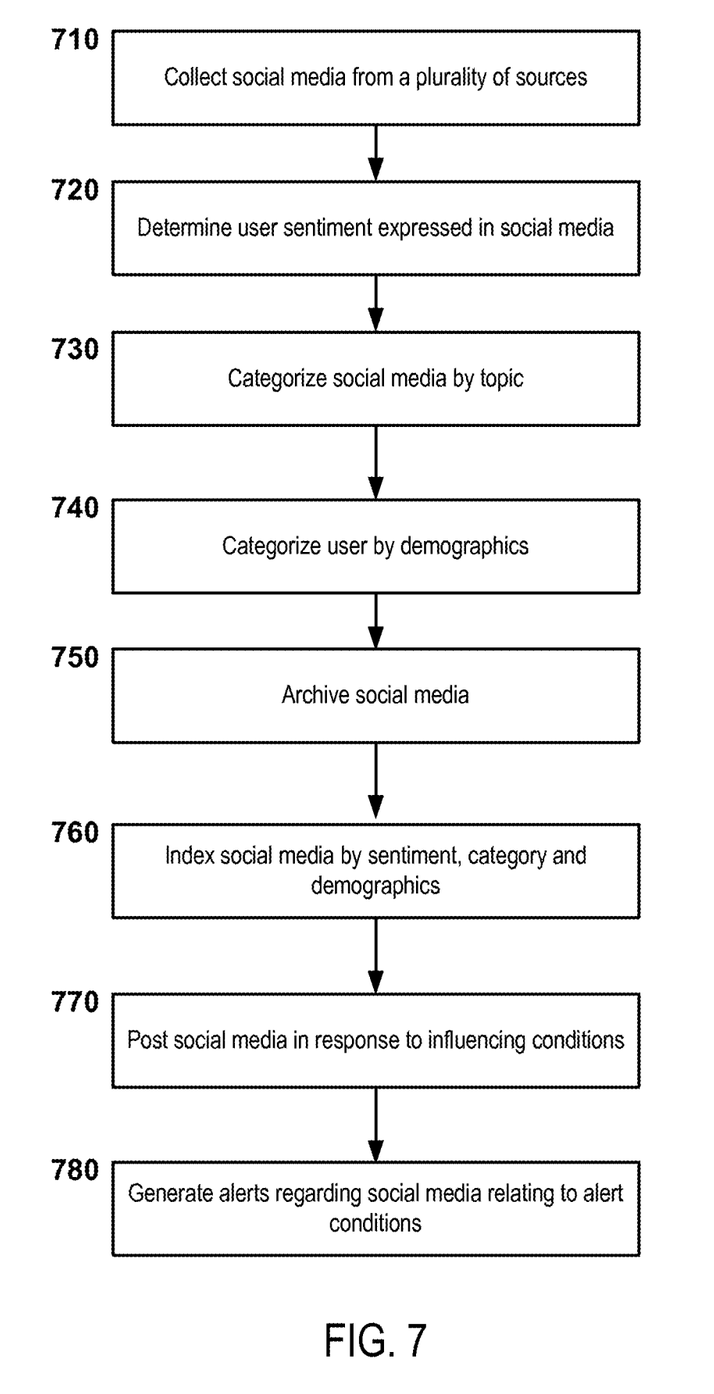
FIG. 7 illustrates a method for aggregating and reporting social media.

FIG. 7 illustrates a method 700 for aggregating and reporting social media. In block 710, a process running on a server collects social media from a plurality of sources. Such sources could include social networking sites, such as Facebook or LinkedIn, or microblogging sites such as Twitter. The process could filter the collected social media by keyword or user ID to reduce the volume of such social media. For example, the process could filter tweets based on a specific company such as "XYZ" and/or "ABC," since a specific company may only be interested in social media posts that relate to that company. In another example, social media could be filtered by topic, for example "network," "response time" or "DSL." In one embodiment, a data collection module (such as element 202 of FIG. 2) hosted on a social media analysis server 200 performs the processing described with respect to block 710. In one embodiment, the processing of block 710 includes parsing the social media to extract entities such as urls, locations, person names, topic tags, user ID, products, and features of products. In one embodiment, the processing of block 710 includes estimating the location from which users submitted social media when the location is not expressly given in the social media.

In block 720, a process running on a server analyzes the social media to determine the user's sentiment, mood or purpose in posting the social media. In one embodiment, the process detects user sentiment in social media by recognizing positive words, such as "awesome," "rock," "love" and "beat" and negative words such as "hate," "stupid" and "fail." The correlation between a sentiment and key word could vary by source. In one embodiment, the process collects and archives only social media posts that express an opinion. In one embodiment, the process collects and archives posts expressing an opinion only if a fixed number, for example three, of posts express the same opinion. In one embodiment, a sentiment analysis module (such as element 205 of FIG. 2) hosted on a social media analysis server 200 performs the processing described with respect to block 720.

In block 730, a process running on a server analyzes the social media to categorize the media by one or more topics. Such topics could include brand (e.g. "Honda" or "Coca Cola") product type ("car," or "SUV"), or product quality ("good," "bad" or "unreliable"). Such topics could be predefined, or the process could determine topics dynamically by consolidating social media posts from multiple users. In one embodiment, the process could use such topics to cluster social media posts as shown in FIG. 4. In one embodiment, the process could assign specific topics a priority or importance. For example, the process could assign a topic such as "network outage" a higher priority than "slow response." In one embodiment, a social data categorization module (such as element 210 of FIG. 2) hosted on a social media analysis server 200 performs the processing described with respect to block 730.

In block 740, a process running on a server analyzes the user posting the social media to categorize users associated with each post by one or more demographic categories. Such categories could include age, income level and interests (e.g. classical music or cross country skiing). Such categories could include user location (e.g. city, state or region). The process could determine such information from user profile data or from the content of social media posts. The process could determine such information by mining a user's social network (e.g. the user's friends on Facebook, etc.) In one embodiment, a user categorization module (such as element 215 of FIG. 2) hosted on a social media analysis server 200 performs the processing described with respect to block 740. In one embodiment, the processing of block 740 additionally includes determining the influence of individual users within their demographic group.

In block 750, a process running on a server archives the social media to a computer readable medium. The process could store the social media on any type of database known in the art, such as, for example, a relational database. The database could include all, or a subset of the data collected in the operation described above with respect to block 710. For example, the process could only archive data relating to specific entities (e.g. "XYZ") and/or topics ("network" or "customer service"). In one embodiment, a data archiving module (such as element 220 of FIG. 2) hosted on a social media analysis server 200 performs the processing described with respect to block 750.

In one embodiment, in addition to archiving social media with high precision and recall, the system archives user profiles and the social connections of the users associated with the social media along with the social media. In one embodiment, the processing of block 740 collects all such information. Additionally or alternatively, the processing of block 750 includes retrieving the user profiles and social connections of users relating to the archived social media.

In block 760, a process running on a server indexes the archived social media by one or more properties. The process indexes the data to allow for efficient retrieval of social media by its properties. Such properties could include, for example, key words, user sentiments, or user demographics. In one embodiment, a data indexing module (such as element 230 of FIG. 2) hosted on a social media analysis server 200 performs the processing described with respect to block 760.

In block 770, a process running on a server posts data to social media websites to influence users of the social media websites. In one embodiment, the processing of block 770 includes determining to what extent archived social media is crucial to targeted businesses, measuring the influence of relevant posts within the archived social media and predicting the influence of newly archived social media. In one embodiment, where the processing determines that newly archived social media indicates an opportunity to influence users, the system can post new media to social media sites to attempt to influence users.

The process could influence users in a number of ways. The process could influence users by including posts to improve the perception of a company's customer service. For example, if a user posts a tweet reporting slow response time on a network, the process could post a tweet that indicates that the network provider is aware of the problem and is working on it. The process could influence users by including posts to increase demand for a company's services. For example, if a user posts a tweet reporting poor customer service by a competitor, the process could post a tweet suggesting the user try the company's service offerings. In one embodiment, an influencing module (such as element 235 of FIG. 2) hosted on a social media analysis server 200 performs the processing described with respect to block 770.

In block 780, a process running on a server analyzes archived social media to determine if alert conditions have occurred. For example, where a user posts a tweet reporting slow response time on a network, the process could send an operations center an alert (e.g., an email or a text message) indicating that an alert condition has occurred (e.g., slow network response time). Any type of condition, such as a customer complaint, could trigger an alert to a business unit within a company that is best suited to respond to the alert. In one embodiment, a trending and alert module (such as element 245 of FIG. 2) hosted on a social media analysis server 200 performs the processing described with respect to block 780. In one embodiment, the processing in block 780 monitors trends of the archived posts and categorized topics and issues alerts when suspicious indicators appear based on statistical models or patterns.

Figure 8:
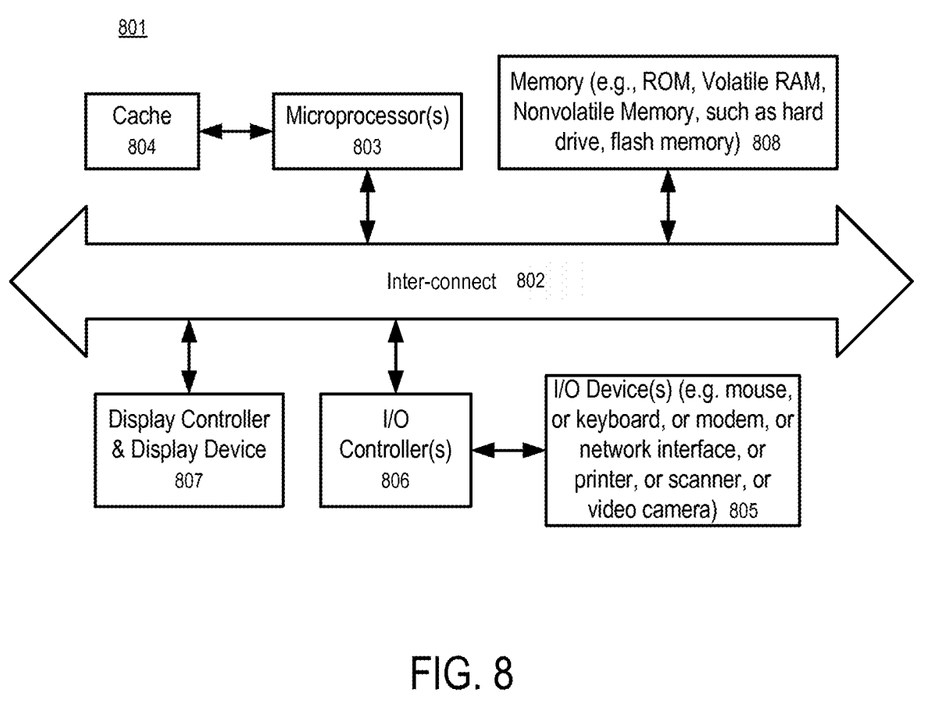
FIG. 8 shows a block diagram of a data processing system which can be used in various embodiments of the disclosed system and method.

FIG. 8 shows a block diagram of a data processing system 801 which can be used in various embodiments of the disclosed system and method. While FIG. 8 illustrates various components of a computer system, it is not intended to represent any particular architecture or manner of interconnecting the components. Other systems that have fewer or more components may also be used. In one embodiment, one or more data processing systems, such as that shown in

801 of FIG. 8, implement the social media analysis servers 200 shown in FIGS. 1 and 2. In one embodiment, a data processing system, such as that shown in 801 of FIG. 8, implements each of the modules 202-250 of the social media analysis server 200 of FIG. 2, where each of the modules comprises computer-executable instructions stored on the system's memory 808, such instructions being executed by the system's microprocessor 803. Other configurations are possible, as will be readily apparent to those skilled in the art.

In FIG. 8, the data processing system 801 includes an inter-connect 802 (e.g., bus and system core logic), which interconnects a microprocessor(s) 803 and memory 808. The microprocessor 803 is coupled to cache memory 804 in the example of FIG. 8.

The inter-connect 802 interconnects the microprocessor(s) 803 and the memory 808 together and also interconnects them to a display controller and display device 807 and to peripheral devices such as input/output (I/O) devices 805 through an input/output controller(s) 806. Typical I/O devices include mice, keyboards, modems, network interfaces, printers, scanners, video cameras and other devices which are well known in the art.

The inter-connect 802 may include one or more buses connected to one another through various bridges, controllers and/or adapters. In one embodiment the I/O controller 806 includes a USB (Universal Serial Bus) adapter for controlling USB peripherals, and/or an IEEE-1394 bus adapter for controlling IEEE-1394 peripherals.

The memory 808 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, the social media analysis servers 200 are implemented using one or more data processing systems as illustrated in FIG. 8. In some embodiments, one or more servers of the system illustrated in FIG. 8 are replaced with the service of a peer to peer network or a cloud configuration of a plurality of data processing systems, or a network of distributed computing systems. The peer to peer network, or cloud based server system, can be collectively viewed as a server data processing system.

Embodiments of the disclosure can be implemented via the microprocessor(s) 803 and/or the memory 808. For example, the functionalities described above can be partially implemented via hardware logic in the microprocessor(s) 803 and partially using the instructions stored in the memory 808. Some embodiments are implemented using the microprocessor(s) 803 without additional instructions stored in the memory 808. Some embodiments are implemented using the instructions stored in the memory 808 for execution by one or more general purpose microprocessor(s) 803. Thus, the disclosure is not limited to a specific configuration of hardware and/or software.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

We claim:

1. A system comprising:
   a first computing device comprising a social media analysis server comprising at least one processor;
   a second computing device comprising a social media website, wherein the second computing device communicates with the first computing device via a network; and
   a memory that stores computer executable instructions comprising a sentiment analysis module, wherein the computer executable instructions, when executed by the at least one processor, cause the at least one processor to execute operations comprising
      collecting, by the first computing device and from the second computing device, a social media post that relates to a topic, wherein the social media post is created by a user, and wherein the social media post is obtained by the first computing device via the network,
      executing, by the first computing device, the sentiment analysis module to analyze the social media post to determine a sentiment expressed in the social media post, the sentiment comprising an opinion that relates to the topic, wherein the sentiment is determined by the sentiment analysis module based on a word included in the social media post,
      providing, by the first computing device and to a third computing device that is in communication with the social media analysis server via the network, a user interface for display at the third computing device, the user interface comprising a first interface that reports a real-time stream of most recent social media posts that relate to the topic, the most recent social media posts comprising the social media post, a second interface that reports most common phrases associated with the most recent social media posts, the most common phrases comprising the word, wherein the word is extracted from one of the most common phrases, and a third interface that reports a count, over a period of time, of social media posts that relate to the topic and the word, and
      providing, by the first computing device and to the third computing device, a further user interface for display at the third computing device, the further user interface comprising the second interface, wherein the word is identified based on a selection of the word in the second interface, wherein the count in the third interface relates to the word, and wherein the user interface is presented at the third computing device in response to detecting the selection.

2. The system of claim 1, wherein the social media post expresses the opinion, wherein the topic comprises a brand and a product type, and wherein collecting the social media post comprises determining that a number of social media posts express the opinion.

3. The system of claim 1, wherein the computer executable instructions, when executed by the at least one processor, cause the at least one processor to execute operations further comprising:
   determining a demographic category associated with the user;
   determining an influence of the user in the demographic category associated with the user; and
   posting, by the social media analysis server, social media to the social media website, wherein the social media is posted to influence users of the social media website.

4. The system of claim 3, wherein the demographic category comprises a location associated with the user, an income level associated with the user, and an age associated with the user, and wherein the location is determined from a content of the social media post.

5. The system of claim 1, wherein the computer executable instructions, when executed by the at least one processor, cause the at least one processor to execute operations further comprising:
   determining, based on the word, that an alert condition has occurred; and
   in response to the determining, sending an alert to a business unit, wherein the alert indicates that the alert condition has occurred.

6. The system of claim 1, wherein the computer executable instructions, when executed by the at least one processor, cause the at least one processor to execute operations further comprising:
   determining, by the sentiment analysis module and based on the word, that the social media post expresses a negative sentiment; and
   in response to determining that a number of social media posts have expressed the negative sentiment, archiving the social media post.

7. A method comprising:
   collecting, by a first computing device comprising a social media analysis server comprising at least one processor that executes a sentiment analysis module that is hosted on the social media analysis server, a social media post that relates to a topic, wherein the social media post is created by a user, and wherein the social media post is collected by the first computing device from a second computing device comprising a social media website, wherein the second computing device communicates with the first computing device via a network;
   executing, by the social media analysis server, the sentiment analysis module to analyze the social media post to determine a sentiment expressed in the social media post, the sentiment comprising an opinion that relates to the topic, wherein the sentiment is determined by the sentiment analysis module based on a word included in the social media post;
   providing, by the social media analysis server and to a third computing device in communication with the social media analysis server via the network, a user interface for display at the third computing device, the user interface comprising a first interface that reports a real-time stream of most recent social media posts that relate to the topic, the most recent social media posts comprising the social media post, a second interface that reports most common phrases associated with the most recent social media posts, the most common phrases comprising the word, wherein the word is extracted from one of the most common phrases, and a third interface that reports a count, over a period of time, of social media posts that relate to the topic; and providing, by the first computing device and to the third computing device, a further user interface for display at the third computing device, the further user interface comprising the second interface, wherein the word is identified based on a selection of the word in the second interface, wherein the count in the third interface relates to the word, and wherein the user interface is presented at the third computing device in response to detecting the selection.

8. The method of claim 7, wherein the social media post expresses the opinion, wherein the topic comprises a brand and a product type, and wherein collecting the social media post comprises determining that a number of social media posts express the opinion.

9. The method of claim 7, further comprising:
determining, based on the word, that an alert condition has occurred; and
in response to the determining, sending an alert to a business unit, wherein the alert indicates that the alert condition has occurred.

10. The method of claim 7, further comprising:
determining a demographic category associated with the user;
determining an influence of the user in the demographic category associated with the user; and
posting, by the social media analysis server, social media to the social media website, wherein the social media is posted to influence users of the social media website.

11. The method of claim 10, wherein the demographic category comprises a location from which the user submitted the social media post, an income level associated with the user, and an age associated with the user.

12. The method of claim 11, wherein the location is determined from a content of the social media post.

13. The method of claim 7, further comprising:
determining, by the sentiment analysis module and based on the word, that the social media post expresses a negative sentiment; and
in response to determining that a number of social media posts have expressed the negative sentiment, archiving the social media post.

14. A non-transitory machine readable medium that stores computer executable instructions that, when executed by at least one processor, cause the at least one processor to execute operations comprising:
collecting, from a first computing device comprising a social media website and by a second computing device comprising a social media analysis server comprising the at least one processor, a social media post that relates to a topic, wherein the social media post is created by a user, wherein the second computing device communicates with the first computing device via a network;

executing, by the first computing device, a sentiment analysis module hosted on the social media analysis server to analyze the social media post to determine a sentiment expressed in the social media post, the sentiment comprising an opinion that relates to the topic, wherein the sentiment is determined by the sentiment analysis module based on a word included in the social media post;

providing, by the social media analysis server and to a third computing device in communication with the social media analysis server via the network, a user interface for display at the third computing device, the user interface comprising a first interface that reports a real-time stream of most recent social media posts that relate to the topic, the most recent social media posts comprising the social media post, a second interface that reports most common phrases associated with the most recent social media posts, the most common phrases comprising the word, wherein the word is extracted from one of the most common phrases, and a third interface that reports a count, over a period of time, of social media posts that relate to the topic; and providing, by the first computing device and to the third computing device, a further user interface for display at the third computing device, the further user interface comprising the second interface, wherein the word is identified based on a selection of the word in the second interface, wherein the count in the third interface relates to the word, and wherein the user interface is presented at the third computing device in response to detecting the selection.

15. The non-transitory machine readable medium of claim 14, wherein the social media post expresses the opinion, wherein the topic comprises a brand and a product type, and wherein collecting the social media post comprises determining that a number of social media posts express the opinion.

16. The non-transitory machine readable medium of claim 14, wherein the computer executable instructions, when executed by the at least one processor, cause the at least one processor to execute operations further comprising:
determining a demographic category associated with the user;
determining an influence of the user in the demographic category associated with the user; and
posting, by the social media analysis server, social media to the social media website, wherein the social media is posted to influence users of the social media website.

17. The non-transitory machine readable medium of claim 14, wherein the computer executable instructions, when executed by the at least one processor, cause the at least one processor to execute operations further comprising:
determining, by the sentiment analysis module and based on the word, that the social media post expresses a negative sentiment; and
in response to determining that a number of social media posts have expressed the negative sentiment, archiving the social media post.

* * * * *